United States Patent [19]

MacPhail

[11] Patent Number: 5,280,609
[45] Date of Patent: Jan. 18, 1994

[54] METHODS OF SELECTING DOCUMENT OBJECTS FOR DOCUMENTS STORED IN A FOLDER FORMAT WITHIN AN ELECTRONIC INFORMATION PROCESSING SYSTEM

[75] Inventor: Margaret G. MacPhail, Austin, Tex.

[73] Assignee: International Business Machines Corporation, Armonk, N.Y.

[21] Appl. No.: 453,089

[22] Filed: Dec. 22, 1989

Related U.S. Application Data

[63] Continuation of Ser. No. 138,246, Dec. 23, 1987, abandoned.

[51] Int. Cl.⁵ .............................................. G06F 15/40
[52] U.S. Cl. .................... 395/600; 364/282.1; 364/283.1; 364/283.2; 364/963.3; 364/DIG. 1; 364/419.19
[58] Field of Search ................. 395/600; 364/419

[56] References Cited

U.S. PATENT DOCUMENTS

| | | | |
|---|---|---|---|
| 4,205,780 | 6/1980 | Burns | 235/454 |
| 4,404,649 | 9/1983 | Nunley | 364/900 |
| 4,417,322 | 11/1983 | Berry | 364/900 |
| 4,503,515 | 3/1985 | Caan | 364/900 |
| 4,555,617 | 11/1985 | Brooks et al. | 235/449 |
| 4,601,003 | 7/1986 | Yoneyama | 364/900 |
| 4,633,430 | 12/1986 | Cooper | 364/900 |
| 4,633,430 | 12/1986 | Cooper | 364/900 |
| 4,674,040 | 6/1987 | Barker et al. | 340/734 |
| 4,713,754 | 12/1987 | Agarwal | 364/200 |
| 4,730,252 | 3/1988 | Bradshaw | 364/900 |
| 4,751,740 | 6/1988 | Wright | 364/900 |
| 4,807,142 | 2/1989 | Agarwal | 364/200 |
| 4,823,303 | 4/1989 | Terasawa | 340/724 |
| 4,829,294 | 5/1989 | Iwami et al. | 340/721 |
| 4,873,623 | 10/1989 | Lane | 364/200 |
| 4,945,475 | 7/1990 | Bruffey | 395/600 |

FOREIGN PATENT DOCUMENTS 0110676 11/1983 European Pat. Off. .
0200227 2/1986 European Pat. Off. .

OTHER PUBLICATIONS

Patent Abstracts of Japan, vol. 7, No. 156 (p. 209) (1301) Jul. 8, 1983, & JP-A-58 0066164 (Fujitsu, K.K.) Apr. 20, 1983.
IBM Systems Jounral, vol. 21, No. 1, 1982, Armonk, N.Y., U.S., pp. 54-80; J. G. Sakamoto et al.: "Supporting Business Systems Planning Studies with the DB/DC Data Dictionary".
Proceedings of the 23rd ACM/IEEE Design Automation Conference, Jun. 29, 1986, pp. 41-47; Shlomo Weiss et al.; "DOSS: A Storage System for Design Data".

Primary Examiner—Thomas C. Lee
Assistant Examiner—Eric Coleman
Attorney, Agent, or Firm—Casimer K. Salys; H. St. Julian

[57] ABSTRACT

This invention relates to methods of retrieving and maintaining a document-in-folder object from an information processing system. At least one document object which is associated with an identified document filed in the system is identified. The system then builds a plurality of operands which are necessary for retrieving the at least one data object therefrom. The retrieved identified data object is then presented to an end user for viewing. Document objects can also be retrieved through a level-of-nesting associated with a folder document. If the identified document is a folder document, then the level-of-nesting must be specified. The system then retrieves the data objects associated with the identified folder and the specified level of nesting.

5 Claims, 4 Drawing Sheets

| PARAMETER | OCCURRENCE | | | 36 |
|---|---|---|---|---|
| 38 — ATTRIBUTE PARAMETER SET | REQUIRED | | | |
| 40 — FOLDER PARAMETER SET | CONDITIONAL | | | |
| 42 — DIF PARAMETER SET | CONDITIONAL | | | |

FIG. 3

| PARAMETER | OCCURRENCE | MODIFY | SYSTEM | 44 |
|---|---|---|---|---|
| 46 — FOLDER ATTRIBUTE | REQUIRED | NO | SET | |
| 48 — DIF ATTRIBUTE | REQUIRED | NO | SET | |
| 50 — FOLDER-ONLY ATTRIBUTE | REQUIRED | YES | — | |

FIG. 4

| PARAMETER | OCCURRENCE | MODIFY | SYSTEM | 56 |
|---|---|---|---|---|
| 52 — ATTRIBUTES | REQUIRED | SET | — | |
| 54 — SEQUENCE | REQUIRED | SET | — | |
| ENTERED DOCUMENT | CONDITIONAL | — | SET | |

FIG. 5

METHODS OF SELECTING DOCUMENT OBJECTS FOR DOCUMENTS STORED IN A FOLDER FORMAT WITHIN AN ELECTRONIC INFORMATION PROCESSING SYSTEM

This is a continuation of application Ser. No. 07/138,246 filed Dec. 23, 1987 now abandoned.

CROSS-REFERENCE TO RELATED APPLICATIONS

This application is related in subject matter to the following applications filed concurrently herewith and assigned to a common assignee:

Application Ser. No. 138,539 filed by M. G. MacPhail entitled "Methods of Logically Organizing Documents in a System" now abandoned.

Application Ser. No. 138,272 filed by M. G. MacPhail entitled "Methods of Ordering Documents Within a Folder" now abandoned.

Application Ser. No. 138,534 filed by M. G. MacPhal entitled "Methods of Filing a Document as a Folder" now abandoned.

Application Ser. No. 138,538 filed by M. G. MacPhail entitled "Methods of Distributing an Entire Folder" now abandoned.

The foregoing copending applications are incorporated rated herein by reference.

TECHNICAL FIELD

This invention relates to methods of managing documents in a information processing system and more particularly, to methods of viewing a document-in-folder table-of-contents.

BACKGROUND INFORMATION

In recent times, automation of offices is rapidly becoming a reality for an increasing number of organizations. Office automation helps the organizations integrate data files with text, store and retrieve correspondence and reports electronically, distribute documents electronically and support the day-to-day activities of administrative personnel, professionals and managers.

While some of the benefits of electronic document processing can be realized from a single, stand-alone office system, a network which connects office systems in various locations in the organization increases the productivity of the organization. Physically, a network is a combination of interconnected pieces of equipment and programs used for moving information between points where it may be generated, processed, stored and used. From the viewpoint of an user of the network, the network is a collection of services which are useful in creating, revising, distributing, filing and retrieving documents.

In today's electronic office, documents are physically grouped or stored using one of two following techniques: partition data sets and directories. Partition data sets are storage areas on a disk or other form of storage medium. Documents stored in a partition data set only exist in that storage area and a partition data can not be deleted until all of the documents included therein have been removed. Generally, the documents are filed in the partition data set in the order created and there is no other relationship regarding the order to the documents.

Directories are similar to partition data sets in that they are physical storage areas for documents for files. Documents can not exist in more that one physical storage area. The documents contained in a directory are not logically organized.

In regards to both the partition data sets and the directories, if one filed a group of documents which are related to a general topic and one wanted to review the group of documents, one would have to first locate the partition data set or sets or the directory or directories containing the documents. In partition data sets and directories, documents have to be deleted from the bottom up. It is very difficult to re-arrange documents using these techniques because the documents have to be copied and then deleted. This type of retrieval technique reduces the efficiency of the electronic office.

These prior are techniques facilitates the display of a list of documents which are stored or grouped in a partition data set or directory. However, since a document may be in more than one file, it becomes necessary to know which files contain a particular document. It is not sufficient to know what documents are in file. Knowing where a document exist in the system becomes necessary in maintaining the integrity of the data in the system.

SUMMARY OF THE INVENTION

This invention relates to methods of using document objects from an information processing system. At least one document object which is associated with an identified document filed in the system, is identified. The system then builds a plurality of operands which are necessary for retrieving the at least one data object therefrom. The retrieved identified data object is then presented to an end user for viewing. If the identified document is a folder document, then a level-of-nesting must be specified. The system then retrieves the data objects associated with the identified folder and the specified level of nesting. The data objects are maintained by the system so that each time the document is entered into or removed from a folder, a document-in-folder table-of-contents is updated.

BRIEF DESCRIPTION OF THE DRAWING

FIG. 3, 4, 5 are object structures which are employed in generating a folder document.

DESCRIPTION OF THE PREFERRED EMBODIMENT

Figure 1:
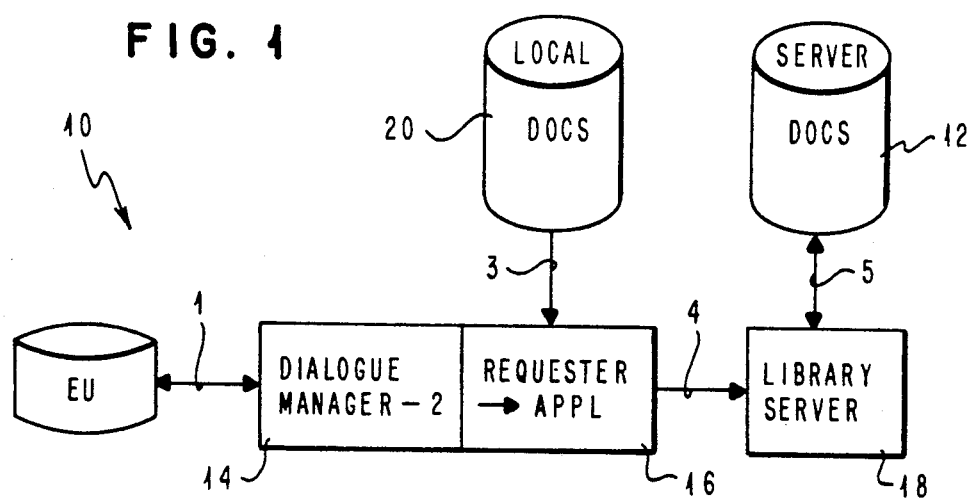
FIG. 1 is a block diagram of a document management system in accordance with the principles of the present invention.

FIG. 1 shows a document management system 10 for controlling the creation, retrieval, editing and distribution of documents within an information processing system. Generally, the document management system 10 enables an end user (EU) to create a folder and file it into a library 12 by interacting with a dialogue manager application 14. Documents filed with the folder and documents presently existing in the library 12 can be entered into the folder when the folder is filed in the library. Each library document has a document-in-folder data area which contains a list of each folder that contains the document. When the document is first filed, a requester application program 16 also transmits an empty document-in-folder table-of-contents data area with the document to the library 12. A library server 18 maintains the document-in-folder table-of-contents for each document stored in the library 12. When the document is entered into a new folder, the library server 18 places a new folder entry at the end of the document-in-folder table-of-contents. More specifically, the EU interacting with the dialogue manager application 14 specifies requester/principal identifiers, a document library identifier (LADN), any document objects to be viewed such as the document-in-folder table-of-contents, and any known folder nesting if the identified document is a folder and the EU desires to view document objects from documents within the folder. The requester application program 16, in response to the data collected by the dialogue manager application 14, builds a retrieve request and transmits the request to the library server 18. The library server 18 copies the identified objects for the documents specified by the EU and returns them to the requester application program 16. The requester application program 16 then transmits the identified objects to the dialogue manager application 14 which facilitates the display thereof to the EU. Thereafter. the EU in response to viewing the document-in-folder table-of-contents can manipulate the documents therein separately or as a group.

The document management system 10 shown in FIG. 1 utilizes a uniform structure for exchanging information within the system. This structure includes an encoding scheme which is designed to convey any document, irrespective of it content, from one type of office system to another and to communicate the intent of the person creating or transmitting a document as to the method of processing thereof. One type of structure which meets all of these requirements is the Document Interchange Architecture (DIA) which is a part of the DISOSS office system marketed by the International Business Machines Corporation.

DIA is a program-to-program communication architecture which defines the protocols and data structures that enable programs to interchange information such as documents and messages in a consistent and predictable manner. DIA is independent of the type of information managed by DIA services. DIA includes documents objects which contain parameters or descriptors that describe the contents of the information being transmitted. The descriptors contained in the objects include the name under which the information is to be filed, the authors, the subject of the information and the date the information was filed in the document history. These descriptors enable a document to be searched in a storage medium such as the server library 12.

The server library 12 performs various services for the system 10. These services are used for storing and retrieving documents electronically. Whenever a document is filed in the server library 12, a set of descriptors called a document profile is filed with it. The profile contains the descriptors noted above. Document profiles are used in searching for documents in the library 12. For purposes of illustration and not limitation, a EU can ask the system 10 to search for all documents regarding a particular subject and by a certain author which was filed in the library 12 between any two dates. Upon completing the search. the system presents the EU with a list of the documents which meet the search criteria. The EU could then ask the system 10 to retrieve a copy of a specific document on the list from the library an deliver the copy the EU for printing or viewing.

The server library 12 also provides the following services: file documents in and retrieve or delete documents from the library; update work in progress documents in the library; specify a security level to associate with the document that is being filed; allow authorized end users other than the EU who filed the document to retrieve the document from the library and perform searches for and retrieve documents in the library for other end users. The server library 12 assigns each new document filed in therein a unique name called a library-assigned document name (LADN). This name is returned to the requester and can be used to uniquely identify the document at some later time.

Figure 2:
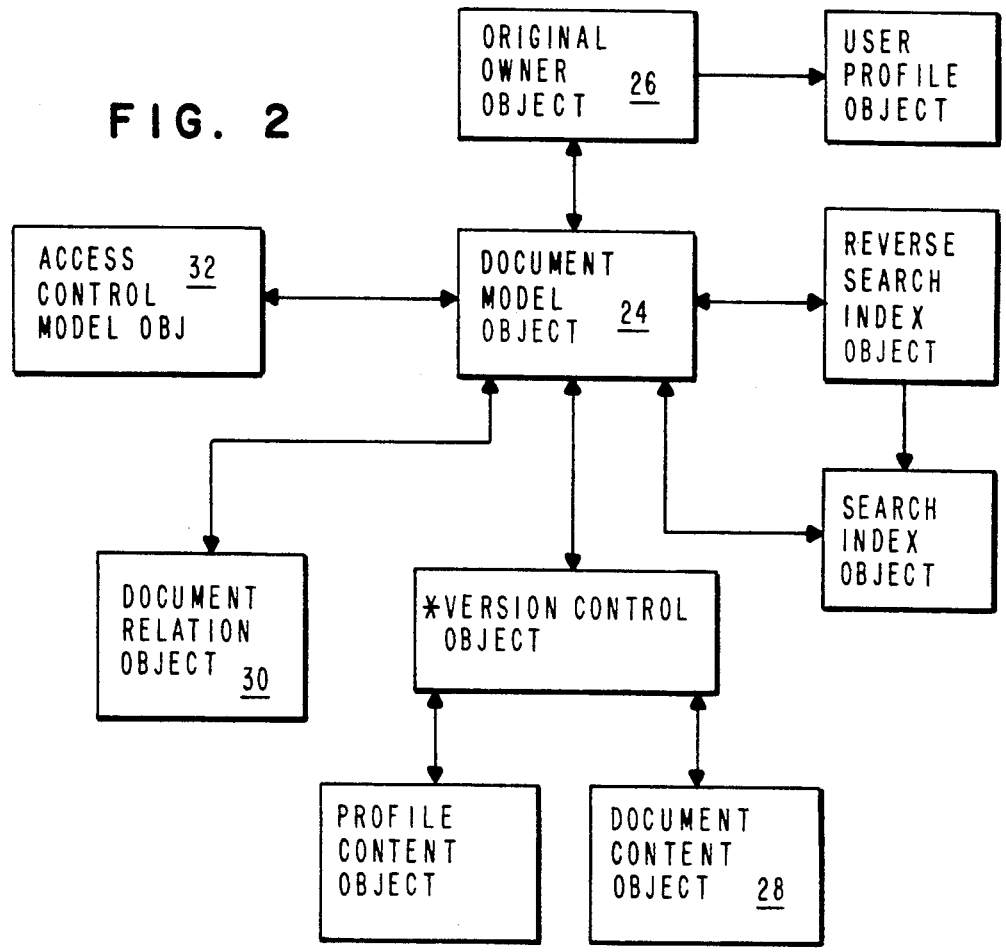
FIG. 2 is a model of a document showing the various objects associated with the document stored in the system of FIG. 1.

Referring to FIG. 2, each document stored in the server library 12 includes the objects shown therein. All of the objects shown in FIG. 2 are created in response to the processing a FILE command. A document model object 24 contains information concerning ownership and attributes of a specific document. This object controls the access to the document during its life in the library.

An original owner object 26 contains or points to information used by an owner of the document to control access to the document is filed.

A document content object 28 provides for the storage of the document content and for saving information relating to the actual size of the filed document.

A document relation object 30 describes the logical relationships between the document and other documents. If the document is a folder. each of the documents contained therein has a pointer or LADN entry in this object. If this document is in one or more folders, then each folder has a pointer or LADN entry in this object. Enter and remove history may be maintained for the document either as a folder or as a document in other folders.

An access control model object 32 is created when the document owner authorizes other users to access the document.

Structures for all of the above-identified objects except document relation object 30 are a part of the DISOSS office system and will not be described herein. FIG. 3 shows a structure 36 of the document relation object 30 which consists of the following: an attribute parameter set 38 and a folder document section 40, a document-within-a-folder section 42.

The attribute parameter set 38 indicates whether or not the document associated with the document relation object 30 is a folder or whether or not the document is a 'folder-only' document. FIG. 4 illustrates a structure 44 for the attribute parameter set 38. A folder attribute 46 indicates whether or not the document associated with the document relation object 30 is a folder. If the document is a folder, then a folder section parameter set is required. A DIF (document in folder) attribute 48 indicates whether or not the document is contained within any folders. A folder-only attribute 50 indicates whether or not the document can be viewed as existing on its own when it is included within a folder. Documents are viewed as folder-only when both the DIF and Folder-only attributes 48 and 50, respectively, are positively set.

A physical document in a physical folder is a folder-only document. In essence, the physical document exists in the folder and can not stand on its own. However, electronic documents can logically exist in multiple places at the same time. Therefore, a document can appear to be in more than one folder and standing on its own all at the same time. Whether or not the document can stand on its own when it is also in a folder is indicated by the folder-only attribute 50. Folder-only documents are viewed as stand-alone when they are not contained by any folders.

The folder document section 40 includes the following sections: folder attributes and entered document parameters set 54. The folder attributes indicates the folder characteristics such as ordering criteria and history. Each document entered into the folder document associated with the document relation object will have an entered document parameter set. FIG. 5 illustrates the structure 56 for the folder document section 40. The attributes parameter 52 allows for the specification of an open option and the history option. The folder is open so that documents can be entered into or removed from the folder after it has been filed in the server library 12. As documents are entered into and removed from the open folder, the history option is specified by an entered document parameter set 54. The entered document parameter is deleted when a document is removed from the folder and is created when the same document is reentered into the folder. The removal date and time and the requester's ID are added to the entered document parameter set. When the document is re-entered into the folder, the date and time and the requester's ID is added to the entered document parameter set.

Set out below is an illustration of an application program useable by the requester application in retrieving a document object associated with a document filed in the information processing system. The program is in program design language from which source code and machine code are derivable.

```
BEGIN REQUESTER PROC
    INPUT
        REQUESTER/PRINCIPAL IDENTIFIERS.
        DOCUMENT LIBRARY IDENTIFIER
            (LADN).
        DOCUMENT OBJECT(S) TO BE VIEWED.
        FOLDER LEVEL-OF-NESTING.
    PROCESS
        SET THE DOCUMENT LIBRARY
            IDENTIFIER (LADN).
        SET THE OBJECTS TO BE RETRIEVED.
        SET THE REQUESTER AND PRINCIPAL
            IDENTIFIERS
        IF THE FOLDER LEVEL-OF-NESTING IS
        SPECIFIED.
            THEN
                SET THE FOLDER LEVEL-OF-
                NESTING AS SPECIFIED.
        ENDIF
        SEND COMPLETED REQUEST TO
            LIBRARY SERVER.
END REQUESTER PROC
```

The requester application program 16 builds an identified data (IDD) operand for the document specified in the request. The IDD operand includes a pointer to the physical location of the document (LADN) and the document model objects to be retrieved. The requester application program 16 then sets the object in the IDD to be the document relation object (DRO) which contains the document-in-folder table-of-contents data area. Thereafter, the requester application program 16 builds operands associated with the specified requester and principal identifiers for this request. If the specified document is a folder, then the objects for all of the documents in the folder to the specified level-of-nesting can be retrieved for viewing by the EU. If the folder level-of-nesting is not specified, only the objects specified for the identified document will be retrieved for viewing. An operand is built by the requester application program 16 if a folder level-of-nesting is specified. The complete request, which includes all of the operands built by the requester application program 16, is transmitted to the library server 18. Set out below is an illustration of an application program useable by the library server in retrieving a document object associated with a document filed in the information processing system. The program is in program design language from which source code and machine code are derivable.

```
BEGIN LIBRARY SERVER PROC
    INPUT
        REQUESTER/PRINCIPAL IDENTIFIERS.
        THE IDD OPERAND FOR THE DOCUMENT
        SPECIFIED IN THIS REQUEST WHICH
        INCLUDES:
            A POINTER TO THE PHYSICAL
            DOCUMENT (LADN).
            THE SPECIFIED DOCUMENTS OBJECTS
            TO BE RETRIEVED.
        FOLDER LEVEL-OF-NESTING.
    PROCESS
        BUILD A NEW OPERAND TO CONTAIN A
        POINTER TO A COPY OF THE SPECIFIED
        OBJECTS AS INDICATED IN THE IDD.
        COPY THE OBJECTS SPECIFIED INTO THE
        IDD DATA AREA FOR THE IDENTIFIED
        DOCUMENT.
        IF THE SPECIFIED DOCUMENT IS A
            FOLDER AND THE FOLDER LEVEL-OF-
            NESTING IS SPECIFIED.
            THEN
                DO FOR EVERY LEVEL SPECIFIED:
                    DO FOR DOCUMENT AT THE
                        CURRENT FOLDER LEVEL-OF-
                        NESTING:
                            BUILD A NEW OPERAND TO
                            CONTAIN A POINTER TO A
                            COPY OF THE SPECIFIED
                            OBJECT AS INDICATED IN THE
                            IDD.
                            COPY THE OBJECTS
                            SPECIFIED INTO THE IDD
                            DATA AREA FOR
                            THIS DOCUMENT.
                    ENDDO
                ENDDO
        ENDIF
        SEND ALL COPIED OBJECTS TO REQUESTER
            APPLICATION
END LIBRARY SERVER PROC
```

The library server 18 builds a new operand for each document whose document-in-folder table-of-contents is to be copied. The new document IDD will contain a pointer to the physical location within the returned data which contains the DRO and the library identifier (LADN) for this document. Thus, the library server 18 builds a reply structure which will contain the operands (IDD) and the data retrieved. The copied objects are in data areas pointed to by the document's operand (IDD). If a level-of-nesting is specified, the library server 18 retrieves the objects for each level specified. For purposes of illustration, a first folder level may include all of the documents directly contained within the specified folder and a second level-of-nesting may include the documents contained within the folders directly contained within the specified folder.

The library server 18 in its reply, builds an IDD operand and associated data areas for each document. The IDD operand built by the library server contains a pointer to the document data area and each document data area contains the DRO and the library identifier (LADN) for the document. The reply is then transmitted by the library server to the requester application program 16.

Set out below is an illustration of an application program useable by the requester application program in receiving the reply from the library server. The program is in program design language from which source code and machine code are derivable.

```
BEGIN REQUESTER RECEIVE REPLY PROC
    INPUT
        FOR EACH DOCUMENT SPECIFIED IN THE
        REQUEST TRANSMITTED, AN IDD
        OPERAND CONTAINING A POINTER TO
        THE DOCUMENT DATA AREA.
        DOCUMENT AREA CONTAINING THE DRO
        AND THE LIBRARY IDENTIFIER (LADN)
        FOR THE DOCUMENT.
    PROCESS
        DO FOR EACH DOCUMENT SPECIFIED
            TRANSMIT THE DOCUMENT-IN-FOLDER
            TABLE-OF-CONTENTS ALONG WITH
            THE LIBRARY IDENTIFIER TO THE
            DIALOGUE MANAGER APPLICATION
            FOR DISPLAY TO THE EU.
        ENDDO
END REQUESTER RECEIVE REPLY PROC
```

The requester application program 16 transmits each document's data to the dialogue manager application 14 which will be displayed to the EU. The data transmitted includes the document-in-folder table-of-contents and any other descriptive information which the EU specified.

Figure 6:
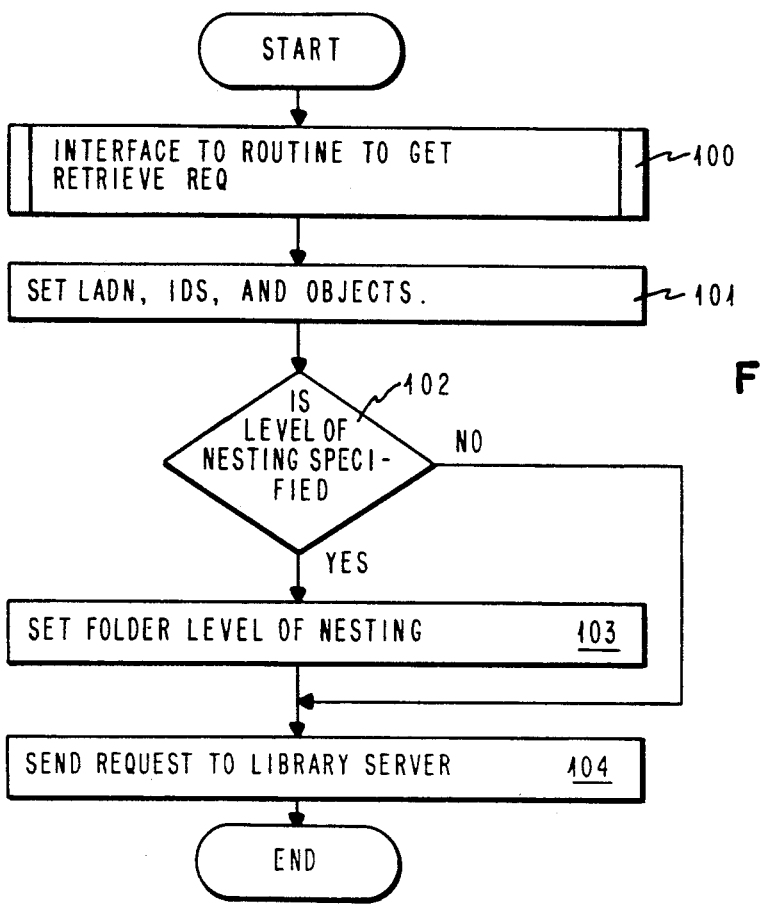
FIGS. 6, 7, 8, 9 and 10 are various flow charts illustrating detailed steps of the method of the present invention.

Referring to FIG. 6, there is shown a flow chart for the requester application program 16 in preparing and transmitting the request to the library server 18. First, in step 100, the application program 16 interfaces with the dialogue manager application 14 to get the data input by the EU. The library identifiers, requester/principal identifiers and objects are set in step 101. Step 102 determines whether the level-of-nesting has been specified. If the document is folder, the folder level of nesting is set in step 103 and the request is transmitted to the library server 18 in step 104. If the level-of-nesting was not specified in step 102, control is transferred from step 102 to step 104 for transmission of the request to the library server 18.

Figure 7:
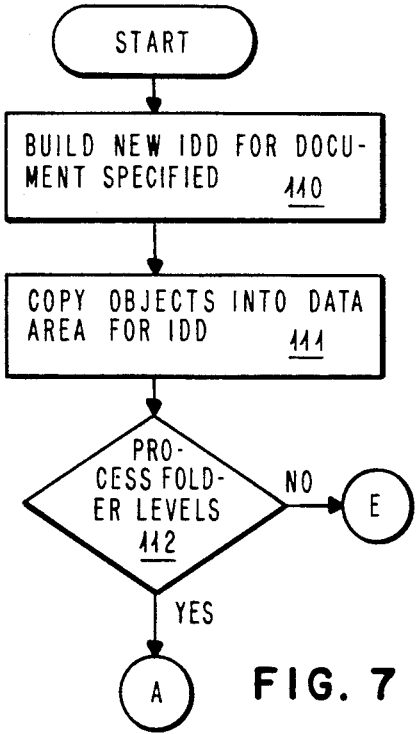
Figure 8:
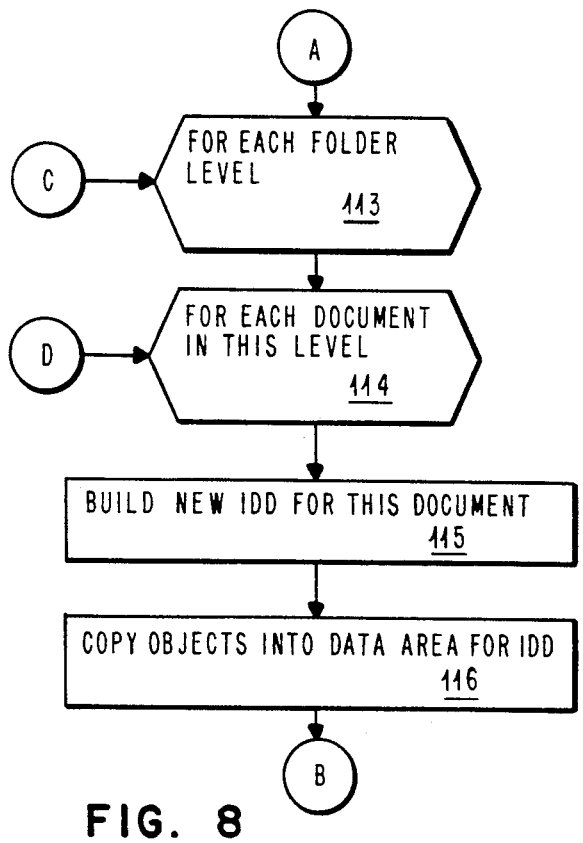
Figure 9:
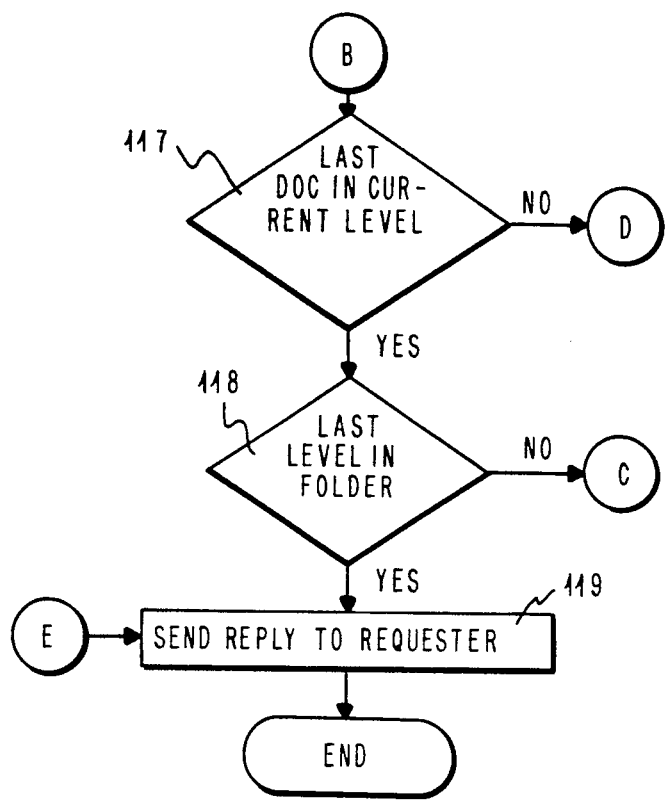

Referring to FIGS. 7, 8 and 9, there is shown a flow chart for the library server 18 for retrieving the specified document objects from the library 12. In step 110, the library server 18 builds a new IDD for the document specified in the request. All of the specified objects are copied into data areas associated with the IDD in step 111. Step 112 determines whether the document is a folder. In steps 113, 114, 115 and 116, if the document is a folder in step 112, then for folder level specified and each document in the specified level, a new IDD is built and objects asociated with each of the documents are copied into data areas associated with the IDD. Step 117 determines whether all of the documents in the current level have been processed. If there are more documents in the current level to be processed, control is transferred from step 117 to step 114. Otherwise, step 118 determines whether all of the levels in the folder have been processed. If there are other levels in the folder to be processed, control is transferred from step 118 to step 113. Otherwise, a reply is transmitted to the requester application program 16 in step 119 if the last folder level has been processed. If the document in step 112 was not a folder, control is transferred from step 112 to step 119 wherein the replay is transmitted to the requester application program 16.

Figure 10:
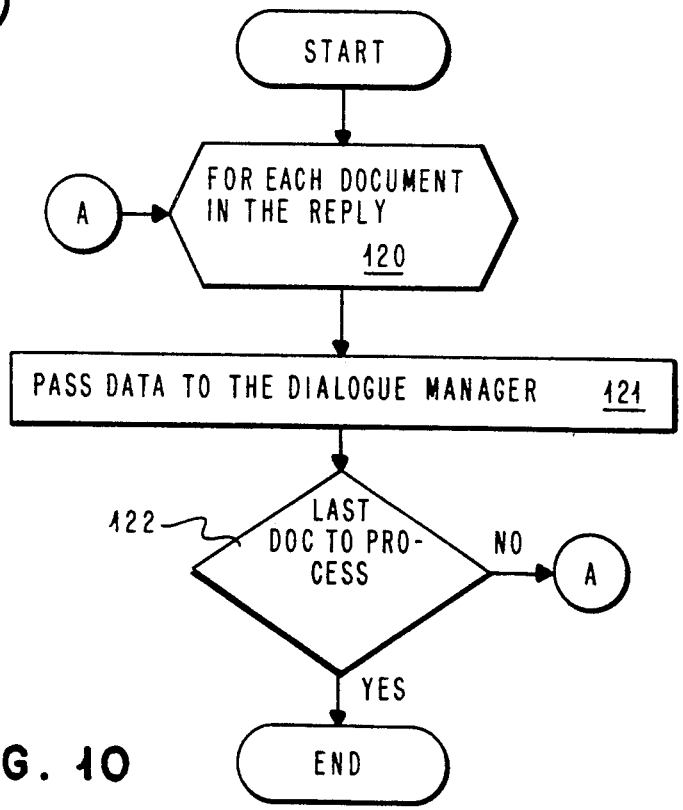

Referring to FIG. 10, there is shown a flow chart for the requester application program 16 for receiving the reply from the library server 18 and transmitting the reply to the dialogue manager application 14. In steps 120 and 121, the requester program transmits, for each document in the reply, the data received from the library server 18 to the dialogue manager application 14. Step 122 determines whether all of the documents have been processed. If there are documents waiting to be processed, control is transferred from step 122 to step 120 for further processing.

In summary, a method of using document objects associated with a document filed within a information processing system. An end user interacts with a dialogue application manager and enters data which is necessary to request the object to be viewed. The system, in response to the entered data, retrieves the objects specified in the entered data and then displays the objects to the end user for further processing. Each of the objects displayed to the end user can be manipulated either separately or as a group.

While the invention has been particularly shown and described with reference to a preferred embodiment, it will be understood by those skilled in the art that various changes in form and detail may be made without departing from the spirit and scope of the invention.

I claim:

1. In an information processing system having a plurality of documents stored therein, a method of retrieving at least one document object associated with a specified document, said method comprising the steps of:

selecting one of a plurality of documents stored in said system;

displaying, in response to said selecting step, a list of documents objects associated with said selected one of said plurality of documents, said document objects, which are separate from said selected one of said plurality of documents, being created when said selected one of said plurality of documents was filed within said system;

relating documents to folders by linking pointers filed within the system; and selecting a document-in-folder table-of-contents object from said list to display the folder documents which include said selected one of said plurality of documents.

2. The method as recited in claim 1 further includes the steps of:

determining whether said selected one of said plurality of documents is a folder document; and displaying a list of objects associated with each document within said folder document.

3. In an information processing system having a plurality of documents stored therein, a method of retrieving at least one document object associated with a selected one of said plurality of documents, said method comprises the steps of:

generating a folder document;

specifying a plurality of documents to be included in said folder document;

establishing a criteria for ordering said plurality of documents in said folder document;

generating a plurality of document objects which are stored in association with said folder document and each of said specified plurality of documents, respectively said document objects being created when said folder document and each of said plurality of documents are filed in said system;

selecting one of said specified plurality of documents;

displaying as defined by said criteria for ordering a list of document objects associated with said selected one of said specified plurality of documents;

relating documents to folders by linking pointers filed within the system; and selecting a document-in-folder table-of-contents object from said list to display the folder documents which include said selected one of said plurality of documents.

4. The method as recited in claim 3 further includes the steps of:

automatically specifying by the system a level of nesting of documents within said folder documents; and displaying a list of document objects associated with each of said specified plurality of documents within said folder document up to said specified level of nesting.

5. In an information processing system having a plurality of documents stored therein, a method of retrieving at least one document object associated with a selected one of said plurality of documents, said method comprises the steps of:

generating a folder document;

specifying a plurality of documents to be included in said folder document;

establishing a criteria for ordering said plurality of documents in said folder document;

generating a plurality of document objects which are stored in association with said folder document and each of said specified plurality of documents, respectively said document objects being created when said folder document and each of said plurality of documents are filed in said system;

selecting one of said specified plurality of documents;

displaying as defined by said criteria for ordering a list of document objects associated with said selected one of said specified plurality of documents;

selecting a document-in-folder table-of-contents object from said list to display the folder documents which include said selected one of said plurality of documents;

automatically specifically by the system a level of nesting of documents within said folder documents; and displaying a list of document objects associated with each of said specified plurality of documents within said folder document up to said specified level of nesting.

* * * * *